United States Patent
Madrid

(10) Patent No.: US 6,712,969 B2
(45) Date of Patent: Mar. 30, 2004

(54) METHODS OF PHOSPHOROUS REDUCTION IN STORMWATER RUNOFF SYSTEMS USING IRON HUMATE

(76) Inventor: Larry Madrid, 175 E. Summerlin St., Bartow, FL (US) 33830

(*) Notice: Subject to any disclaimer, the term of this patent is extended or adjusted under 35 U.S.C. 154(b) by 0 days.

(21) Appl. No.: 10/059,968

(22) Filed: Jan. 30, 2002

(65) Prior Publication Data

US 2003/0141259 A1 Jul. 31, 2003

(51) Int. Cl.$^7$ .................. C02F 1/28; C02F 3/32
(52) U.S. Cl. ............ 210/602; 210/683; 210/747; 210/96; 210/730
(58) Field of Search .................. 210/170, 747, 210/602, 611, 613, 906, 730

(56) References Cited

U.S. PATENT DOCUMENTS

| | | | | |
|---|---|---|---|---|
| 3,872,002 A | * | 3/1975 | Musgrove | 210/730 |
| 5,057,227 A | * | 10/1991 | Cohen | 210/747 |
| 5,322,629 A | * | 6/1994 | Stewart | 210/170 |
| 5,462,666 A | * | 10/1995 | Kimmel | 210/602 |
| 5,487,622 A | * | 1/1996 | Cherry et al. | 210/170 |
| 5,690,827 A | * | 11/1997 | Simmering et al. | 210/747 |
| 5,876,606 A | * | 3/1999 | Blowes et al. | 210/906 |
| 6,337,025 B1 | * | 1/2002 | Clemenson | 210/747 |

* cited by examiner

Primary Examiner—Christopher Upton
(74) Attorney, Agent, or Firm—George A. Bode; Lisa D. Velez; Bode & Associates

(57) ABSTRACT

A method of phosphorous reduction in stormwater runoff using iron humate, such as in the form of a filter, a layered filter bed, a stacked wall or a liner. The stormwater (fluid) runoff is sent to a fluid retention area such as a retention pond, wetland reservoir or the like where the runoff is filtered through iron humate. While the runoff is filtered, the iron humate absorbs or chemically retains the phosphorous in the runoff to produce filtered runoff with a reduced level of phosphorous. In an alternate embodiment, the runoff can be pumped from a retention pond into a iron humate filter where the runoff is filtered. In another alternate embodiment, the iron humate filter may be placed in a trench below ground to intercept and filter groundwater flows.

19 Claims, 3 Drawing Sheets

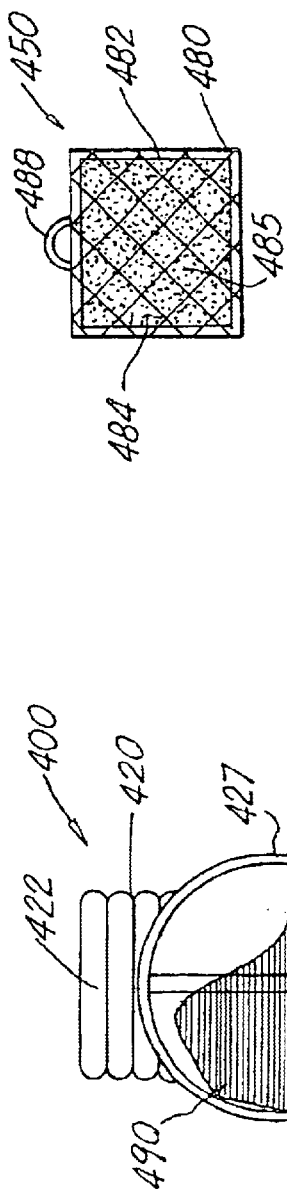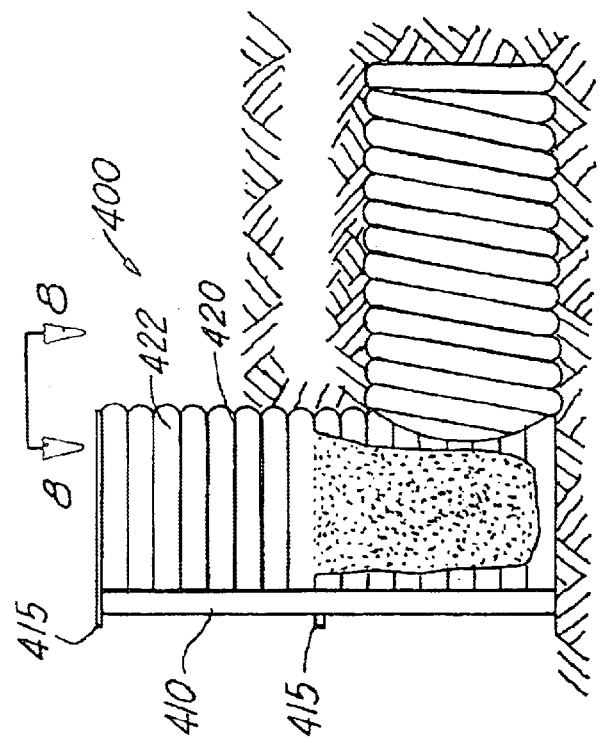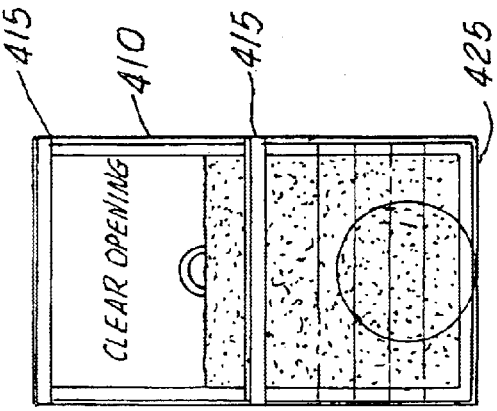

METHODS OF PHOSPHOROUS REDUCTION IN STORMWATER RUNOFF SYSTEMS USING IRON HUMATE

BACKGROUND OF THE INVENTION

1. Field of the Invention

The present invention relates to treatment of runoff water from non-point sources and, more particularly, to a method of phosphorous reduction in stormwater runoff and groundwater systems using iron humate.

2. General Background

Iron humate is a co-product of certain municipal drinking water treatment systems. The material is an iron rich organic compound. It is produced by introducing ferric sulfate to river water as a flocculent to remove floating organic detritus.

Research has proven that excessively high levels of nitrogen and phosphorus have detrimental affects on water bodies, such as Lake Okeechobee, Lake Hancock, the Kissimee River and the Everglades. The State of Florida and the Federal Government are committing billions of dollars to the improvement of water bodies by the reduction of phosphorus from runoff from non-point sources, such as dairy farms, sugar cane fields, and any other lands that use high doses of fertilizer over many years.

Several methods have been patented which are aimed at water treatments to remove nitrogen, phosphorous and other compounds.

U.S. Pat. No. 5,766,474 issued to Landmark Reclamation, Inc., of Denver, Colo., on the application of S. W. Smith, et al., entitled "BIOMASS IMPONDMENT MANAGEMENT SYSTEM FOR PURIFYING WATER," discloses a biomass system for purifying water runoff from ponds and lakes which includes an non-rooted plants and bottom dwelling plants in the impondment to adsorb impurities, such as phosphorous, ammonia, nitrogen and heavy metals.

U.S. Pat. No. 4,707,270 issued to Ube Industries, Ltd., of Japan, on the application of W. Kobayashi, et al., entitled "PROCESS FOR TREATING WASTE WATER CONTAINING PHOSPHORUS COMPOUNDS AND/OR ORGANIC COD SUBSTANCES," discloses a process for treating water using calcium silicate compounds as adsorbent agents to remove various phosphorous compounds.

U.S. Pat. No. 6,036,851 issued to S. G. Simmering, et al., entitled "PEAT BALE FILTRATION ELEMENT," discloses treating stormwater runoff to remove phosphorous in a retention pond with a peat bale in a layered filtration bed.

U.S. Pat. No. 6,042,743 issued to Environmental Filtration, Inc, of Brooklyn Park, Minn., entitled "METHOD OF PROCESSING PEAT FOR USE IN CONTAMINATED WATER TREATMENT," discloses a method of processing peat for treating contaminated aqueous solutions.

U.S. Pat. No. 5,322,629 issued to W & H Pacific, Inc., of Bellevue, Wash., on the application of W. C. Stewart, entitled "METHOD AND APPARATUS FOR TREATING STORM WATER," discloses an apparatus for treating stormwater runoff with humas-rich compost in beds as an adsorbent to remove contaminants such as phosphorous from drain fields.

U.S. Pat. Nos. 5,462,666 and 5,670,046 issued to RJJB & G, Inc., of West Palm Beach, Fla., on application of R. C. Kimmel, entitled "TREATMENT OF NUTRIENT-RICH WATER," discloses a multistage treatment system which treats water having nitrogen compounds, phosphorous compounds, and other minerals. An insoluble salt is used to precipitate phosphorous compounds and other minerals wherein the precipitate is separated in a separation device.

U.S. Pat. No. 5,174,897 issued to The United States of Americas as represented by the Secretary of Agriculture, of Washington, D.C., on application of Wengrzynek, entitled "CONSTRUCTED WETLANDS TO CONTROL NON-POINT SOURCE POLLUTION," discloses a construct of a sediment basin, level-lip spreader, grassy filter, wetlands and a deep pond used to remove pollutants from nonpoint source runoff.

U.S. Pat. Nos. 5,213,692, 5,302,180 and 5,411,569, issued to Kemiron, Inc., of Bartown (Sic), Fla., on application of Hjersted, disclose an iron humate product and processes for preparing iron humates such as for vegetation and supplementation of animal feedstock.

U.S. Pat. No. 5,354,350 issued to The Vigoro Corporation, of Chicago, Ill., on application of Moore, discloses a citrate soluble slow release iron humate agricultural nutrient composition.

SUMMARY OF THE PRESENT INVENTION

The preferred embodiment of the method of phosphorous reduction in stormwater runoff of the present invention solves the aforementioned problems in a straight forward and simple manner.

Broadly, the present invention contemplates a method of phosphorous reduction in stormwater runoff using iron humate, such as in the form of a filter, a layered filter bed, a stacked wall or a liner.

More specifically, the method of phosphorous reduction in stormwater runoff of the present invention comprising the steps of: channeling a fluid runoff into a fluid retention area; filtering the fluid runoff through iron humate to absorbing phosphorous from the fluid runoff with the iron humate to create filtered fluid runoff; and, discharging the filtered fluid runoff out of the fluid retention area.

Additionally, the present invention contemplates an iron humate filter comprising: a mesh cage housing having mesh cage walls; a geotextile fabric lining the mesh cage housing; and, iron humate enclosed in the mesh cage housing wherein fluid is adapted to flow through the mesh cage housing and the geotextile fabric to the iron humate where phosphorous is absorbed or chemically retained.

The above and other objects of the present invention will become apparent from the drawings, the description given herein, and the appended claims.

BRIEF DESCRIPTION OF THE DRAWING

For a further understanding of the nature and objects of the present invention, reference should be had to the following description taken in conjunction with the accompanying drawings in which like parts are given like reference numerals and, wherein:

FIG. 6 illustrates an top plan view an iron humate filter assembly of the present invention;

FIG. 7 illustrates an second embodiment of an iron humate filter for use with the iron humate filter assembly of FIG. 6;

FIG. 8 illustrates a side view of the iron humate filter assembly of FIG. 6; and, FIG. 9 illustrates a cross-sectional view along the PLANE 8—8 of the embodiment of FIG. 9.

DETAILED DESCRIPTION OF THE PREFERRED EMBODIMENT

Overview

The overall method of phosphorous reduction in stormwater runoff of the present invention uses barriers, liners or structures of iron humate (FeHu), hereinafter referred to as iron humate filters submerged in an fluid retention area down stream of the stormwater runoff to absorb phosphorous from the stormwater runoff. In the exemplary embodiment, the stormwater runoff flows or is channeled to the fluid retention area from non-point sources (e.g., dairy farms, sugar cane fields).

Figure 1:
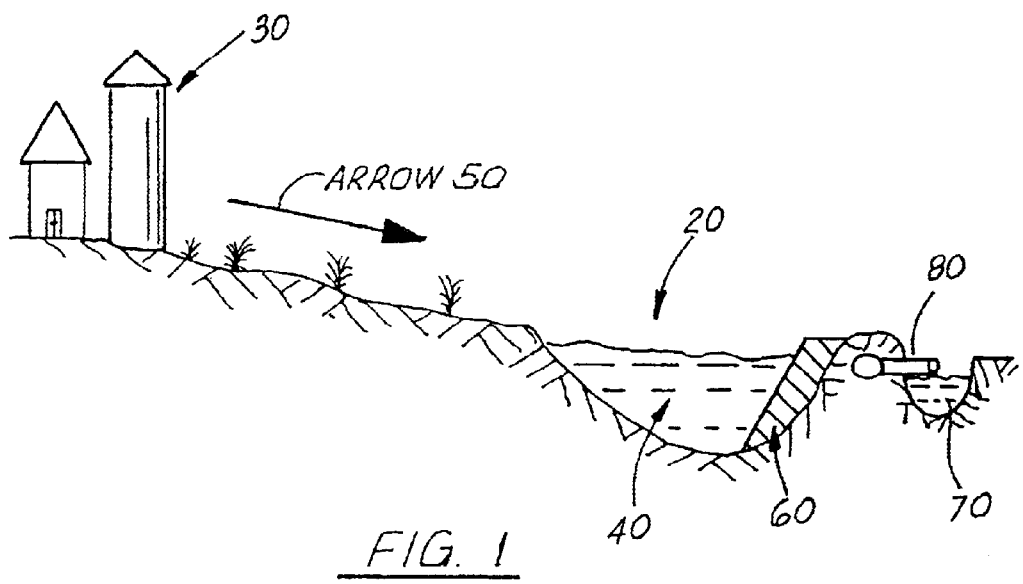
FIG. 1 illustrates an iron humate filter installation employing a retention pond to carrying out the method of the present invention.
Figure 2:
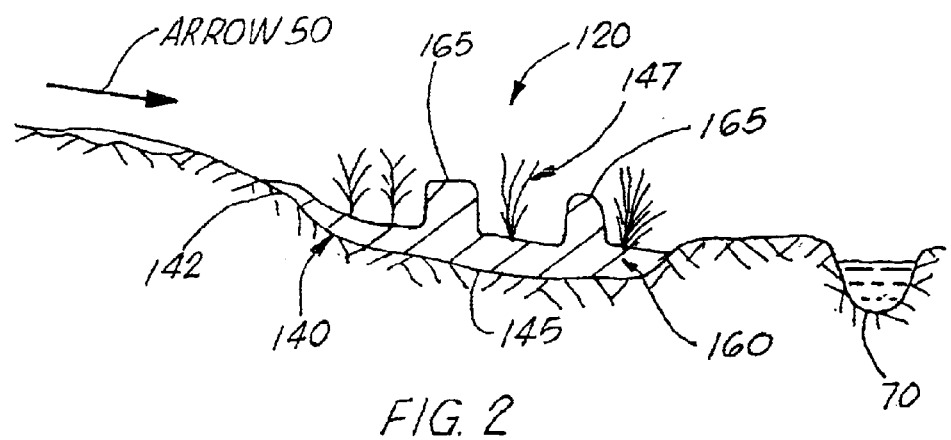
FIG. 2 illustrates an iron humate filter installation employing a wetland reservoir to carrying out the method of the present invention.
Figure 3:
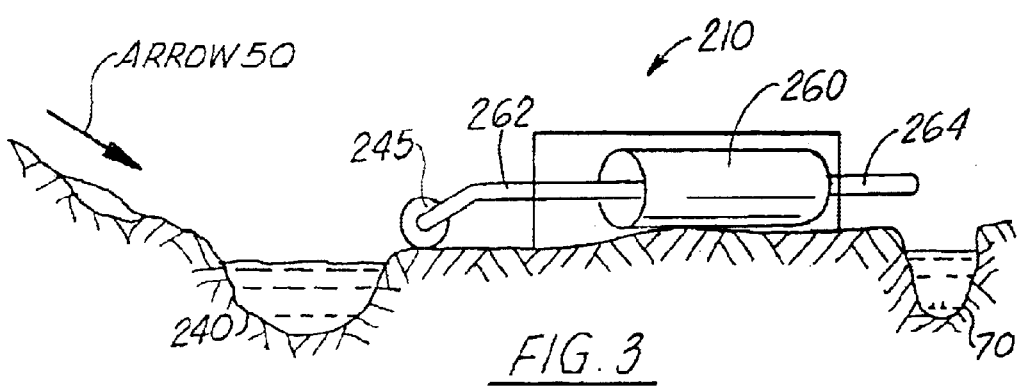
FIG. 3 illustrates an iron humate filter installation employing a retention pond to carrying out the method of the present invention in combination with a turnkey treatment plant.
Figure 4:
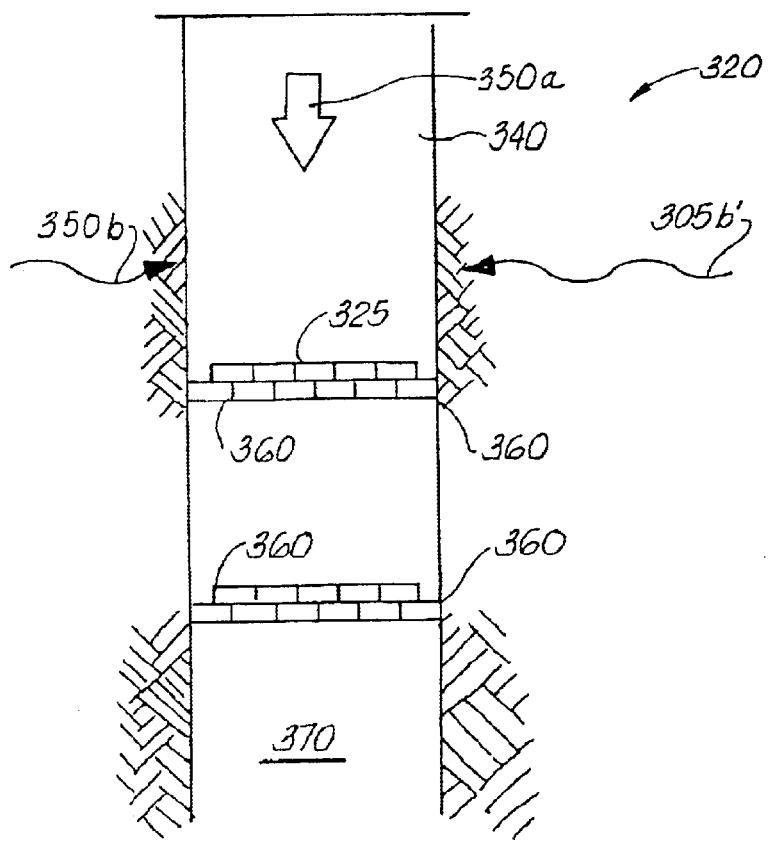
FIG. 4 illustrates an iron humate installation employing an agricultural ditch to carrying out the method of the present invention.

The fluid retention area may be a retention pond 40 or 240, as best seen in FIGS. 1 and 3, wetland reservoir 140 with vegetation, as best seen in FIG. 2 or an agricultural ditch 340, as best seen in FIG. 4.

Referring now to the iron humate filter, FeHu has a strong ability to adsorb (chemically retain) phosphorous. Hence, I have determined that with the problems of high nitrogen and phosphorous levels in Florida's waters, a structure of FeHu, which allows stormwater runoff to flow therethrough, chemically retains phosphorous found in the stormwater runoff. Thereby, the FeHu can be used to reduce phosphorous from non-point sources of stormwater runoff (e.g., dairy farms, sugar cane fields).

Since the FeHu chemically absorbs phosphorous or phosphorous compounds, the iron humate filter will become saturated. When the iron humate filter becomes saturated, the iron humate filter should be removed and replaced with another iron humate filter. As will be described in more detail below, alternately, the saturated iron humate in the iron humate filter may be replaceable with a clean or non-saturated iron humate instead of removing the filter.

EXAMPLE 1

Referring now to FIG. 1, the method of phosphorous reduction in a stormwater runoff, is best seen in FIG. 1, where a iron humate filter installation 20 is employed downstream of a dairy farm or other non-point stormwater runoff source 30. The iron humate filter installation 20 includes a retention pond 40 which is positioned to down stream the surface stormwater runoff flow ARROW 50 and slows the surface stormwater runoff flow ARROW 50 down. The stormwater runoff filters through the iron humate filter 60. The iron humate filter installation 20 further includes a retention pond drain pipe 80 which discharges or channels filtered stormwater runoff into a control ditch 70 on the output side of the iron humate filter 60. The filtered stormwater runoff in the control ditch 70 has a significantly lower level of phosphorous. Thereafter, the fluid solution in the control ditch 70 can then be funneled to other water ways or used appropriately.

Eventually, the iron humate in the iron humate filter 60 will reach "breakthrough" or a phosphorous saturation stage—a stage where it cannot retain any more phosphorous—and a fresh iron humate filter 60 would be needed. The saturated or phosphorous-laden FeHu could then be sold or processed into fertilizer.

EXAMPLE 2

Referring now to FIG. 2, an alternate embodiment for carrying out the method of the present invention that includes iron humate filter installation 120 downstream of a non-point stormwater runoff source 30 (FIG. 1) is shown. The iron humate filter installation 120 includes a wetland reservoir 140 which is positioned to slow down surface stormwater runoff flow ARROW 50 into the wetland reservoir 140. The wetland reservoir 140 is lined, including its perimeter sides 142 and bottom floor 145, with a iron humate filter liner 160 which filters the stormwater runoff flow ARROW 50.

As is well known, FeHu, a known fertilizer, provides iron and other nutrients for vegetation. Thus, the iron humate filter liner 160 promotes vegetation growth 147 in the wetland reservoir 140 while also absorbing phosphorous, thereby also promoting further phosphorous reduction by plant uptake.

The iron humate filter liner 160 further includes iron humate filter mounds 165 spaced along the iron humate filter liner 162. The discharge from the wetland reservoir 140 is sent downstream to control ditch 70.

As described above, eventually, the iron humate will reach "breakthrough" or a phosphorous saturation stage—a stage where it cannot retain any more phosphorous—and a fresh iron humate or iron humate filter liner 160 and mounds 165 would be needed.

EXAMPLE 3

Referring now to FIG. 3, an iron humate filter installation 220 employing a retention pond 240 to carrying out the method of the present invention in combination with a turnkey treatment plant FeHu system 210 is shown. The iron humate filter installation 220 includes an upstream retention pond 240, pump 245 and an iron humate-packed filter 260. The surface stormwater runoff flow ARROW 50 flows down to the upstream retention pond 240, where the stormwater runoff is pumped under pressure through pump 245 to the iron humate-packed filter 260. The discharge of the iron humate-packed filter 260 on outlet port 264 is channeled downstream to control ditch 70.

EXAMPLE 4

Referring now to FIG. 4, an iron humate filter installation 320 employing an agricultural ditch 340 to carrying out the method of the present invention is shown. The agricultural ditch 340 has an aqueous solution flow ARROW 350a and agricultural surface runoff flow ARROWS 350b and 350b'. Downstream from the aqueous solution flow ARROW 350a and the agricultural surface runoff flow ARROWS 350b and 350b', iron humate filters 360 are stacked and positioned across the width of agricultural ditch 340 to create a filtering wall 325. In the exemplary embodiment, there are two walls 325 and 327 adjacent to each other at approximately 500 feet–1000 feet spacing. The discharge from the second wall 327 can be sent downstream to control ditch 370 which flows into a natural creek, stream or river in the direction of ARROW 350c.

Figure 5:
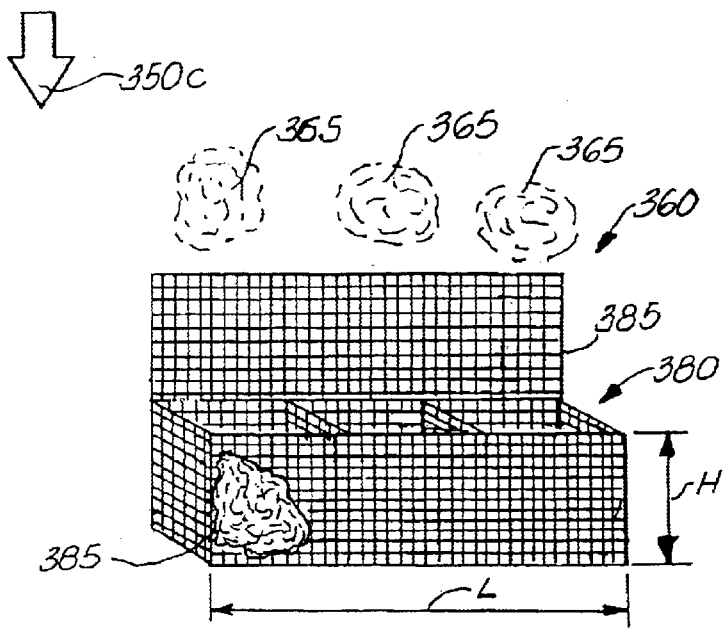
FIG. 5 illustrates a first embodiment of an iron humate filter of the present invention.

Referring now to FIG. 5, a iron humate filter 360 is shown. The iron humate filter 360 includes in general a basket or cage housing 380 made of mesh which is adapted to be filled with iron humate 365. In the exemplary embodiment, the basket or cage housing 380 includes a lid or cover 385 also preferably made of mesh to permit the flow of stormwater runoff to flow therethrough. The lid or cover 385 allows the saturated iron humate 365 to be removed from time-to-time and processed remotely or, alternately, sold. The basket or cage housing 380 is lined with a geotextile fabric 385 with a permittivity of about 100–about 200 gal/SF/min, or, as designed hydraulically to allow water to flow through the system, geotextile fabric 385 holding iron humate 365 inside of cage housing 380 and allowing water to pass therethrough.

In the exemplary embodiment, the basket or cage housing 380 includes a mesh opening of 3"×3" (7.5 cm.×7.5 cm) with a mesh wire of 0.106—US gauge 12 (2.7 mm). The mesh is PVC coated with a minimum thickness of 0.0150" per side and a nominal thickness of 0.0216" per side.

The length L of the basket or cage housing 380 is approximately 6 feet, the width W is approximately 3 feet, the height H is approximately 3 feet. However, the basket or cage housing 370 can have any number of cells or compartments for the placement of the iron humate 365. The compartments are created by the baffle walls also made of mesh.

As can be appreciated, the iron humate filter 60 and a iron humate filter liner 160 with mounds 165 are created filters similar to the iron humate filter 360 but may vary with size. Iron humate filter 260 differs from the submerged iron humate filters 20, 160, and 360 and requires a closed housing for maintaining the fluid pumped therethrough. Furthermore, the iron humate filter 260 requires inlet and outlet ports 262 and 264.

Referring now to FIGS. 6–9, an iron humate filter assembly 400 is shown. Iron humate filter assembly 400 fits into a half-round spillway or L-shaped conduit 420 typically constructed of corrugated metal pipe and widely commercially available. Assembly 400 includes a riser frame 410 with a plurality of cross brace angles 415 supporting an upright tubular channel 422 of L-shaped conduit 420. The tubular channel 422 has a closed bottom 425 and intersects perpendicularly with horizontal tubular channel 427. In the exemplary embodiment, the horizontal tubular channel 427 is semicircular shaped so that the bottom half can lay on the ground or other horizontal surface.

The iron humate filter assembly 400 further includes an iron humate filter 450 which fits in the bottom of the upright tubular channel 422 wherein stormwater runoff flows down the tubular channel 422 through the iron humate filter 450 to horizontal tubular channel 427. The iron humate filter 450 includes a smaller basket or cage housing 480 made of expanded metal mesh which is adapted to be lined with a geotextile fabric 485 and filled iron humate. The geotextile fabric 485 assists in maintaining the iron humate in the basket or cage housing 480. The basket or cage housing 480 includes a top handle 488 to permit the removal of the iron humate filter 450 and may include a rigid metal frame 482 supporting walls of an expanded metal cage 484.

Iron humate filter assembly 400 may further include a steel or aluminum grate 490 positioned at the top of the vertical tubular channel 420.

In an alternate usage or method of deployment, iron humate filters wrapped in geotextile filter fabrics can be fitted inside manholes and other types of stormwater inlets to filter runoff from urban areas, such as streets, parking lots and grassed swales.

Further, flow rates through iron humate may be increased by adding pine bark, rocks or other materials that are more permeable than the iron humate. The specific ratio for a iron humate-pine bark mixture will by necessity be site specific.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A method of phosphorous reduction in stormwater runoff comprising the steps of:
    (a) channeling a fluid runoff into a fluid retention area having vegetation;
    (b) filtering the fluid runoff through iron humate to absorb phosphorous from the fluid runoff with the iron humate to create filtered fluid runoff;
    (c) during step (b), fertilizing said vegetation in said fluid retention area with said iron humate to promote vegetation growth; and,
    (d) discharging the filtered fluid runoff out of the fluid retention area.

2. The method of claim 1, wherein the fluid runoff is stormwater runoff from non-point sources, the non-point sources include any one of a dairy farm or a sugar cane field.

3. The method of claim 1, wherein fluid retention area includes a retention pond.

4. The method of claim 1, wherein the fluid retention area includes a wetland reservoir.

5. The method of claim 1, wherein the retention area is an agricultural ditch.

6. The method of claim 1, further comprising the step of:
    (e) periodically replacing the iron humate with fresh iron humate.

7. The method of claim 6, wherein the step (b) is carried out while the fluid runoff is in the fluid retention area.

8. The method of claim 1, further comprising the step of:
    (e) prior to the step (b), pumping the fluid runoff into a iron humate filter;
    wherein the step (b) is carried out after the step (e).

9. The method of claim 1, wherein the step (b) is carried out while the fluid runoff is in the fluid retention area wherein:
    the step (b) comprises the steps of:
        (b1) filtering the fluid runoff through the iron humate in a first iron humate wall, baffle or mound to absorb the phosphorous found in the fluid runoff to create first filtered fluid runoff; and,
        (b1) filtering the first filtered fluid runoff through the iron humate in a second iron humate wall, baffle or mound to absorb the phosphorous found in the first filtered fluid runoff.

10. A method of phosphorous reduction in stormwater runoff comprising the steps of:
    (a) lining a fluid retention area with a removable iron humate liner having iron humate;
    (b) channeling a fluid runoff into said fluid retention area having vegetation;

(c) filtering the fluid runoff through said removable iron humate liner to absorb phosphorous from the fluid runoff with said iron humate to create filtered fluid runoff;

(d) during step (c), fertilizing said vegetation in said fluid retention area with said iron humate to promote vegetation growth in said fluid retention area;

(e) discharging the filtered fluid runoff out of the fluid retention area;

(f) removing said iron humate liner when saturated with said phosphorous; and, (g) after the step (f), replacing said iron humate liner.

11. The method of claim 10, wherein the fluid runoff is stormwater runoff from non-point sources, the non-point sources include any one of a dairy farm or a sugar cane field.

12. The method of claim 10, wherein the fluid retention area includes a wetland reservoir.

13. The method of claim 10, further comprising the step of:

(h) periodically repeating step (f) and (g).

14. The method of claim 10, wherein the step (c) is carried out while the fluid runoff is in the fluid retention area.

15. A method of phosphorous reduction in stormwater runoff comprising the steps of:

(a) channeling a fluid runoff into a fluid retention area having vegetation;

(b) filtering the fluid runoff, while in said fluid retention area, through iron humate to absorb phosphorous from the fluid runoff with the iron humate to create filtered fluid runoff;

(c) during step (b), fertilizing said vegetation in said fluid retention area with said iron humate to promote vegetation growth; and, (d) discharging the filtered fluid runoff out of the fluid retention area.

16. The method of claim 15, wherein the fluid runoff is stormwater runoff from non-point sources, the non-point sources include any one of a dairy farm or a sugar cane field.

17. The method of claim 15, wherein the fluid retention area includes a wetland reservoir.

18. The method of claim 17, wherein said iron humate is a removable iron humate liner; and further comprising the step of:

(c) lining a fluid retention area with a removable iron humate liner having iron humate, prior to step (a).

19. The method of claim 15, further comprising the step of:

(e) periodically replacing the iron humate with fresh iron humate.

\* \* \* \* \*